United States Patent
Lee

(10) Patent No.: US 9,341,817 B2
(45) Date of Patent: May 17, 2016

(54) OPTICAL SYSTEM

(75) Inventor: Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 82 days.

(21) Appl. No.: 13/593,699

(22) Filed: Aug. 24, 2012

(65) Prior Publication Data

US 2013/0050848 A1   Feb. 28, 2013

(51) Int. Cl.
*G02B 9/60* (2006.01)
*G02B 13/18* (2006.01)
*G02B 13/00* (2006.01)

(52) U.S. Cl.
CPC ............. *G02B 13/0045* (2013.01); *G02B 13/18* (2013.01)

(58) Field of Classification Search
CPC ............. G02B 13/0035; G02B 13/004; G02B 13/0045; G02B 13/18
USPC ........................... 359/714, 753, 763, 764, 767
See application file for complete search history.

(56) References Cited

U.S. PATENT DOCUMENTS

| 8,437,092 | B2 | 5/2013 | Baba |
| 8,514,501 | B2 * | 8/2013 | Chen et al. .................... 359/714 |
| 2011/0157724 | A1 | 6/2011 | Baba |
| 2012/0092544 | A1 | 4/2012 | Noda |
| 2012/0154929 | A1 * | 6/2012 | Tsai et al. .................... 359/714 |
| 2013/0100546 | A1 | 4/2013 | Okano |

FOREIGN PATENT DOCUMENTS

| JP | 48-038138 A | 6/1973 |
| JP | 2009-294528 A | 12/2009 |
| JP | 2011-133600 A | 7/2011 |
| JP | 2011-133601 A | 7/2011 |
| JP | 2012-008489 A | 1/2012 |
| TW | 200949288 A | 12/2009 |
| TW | 2010-43999 A | 12/2010 |

OTHER PUBLICATIONS

Office Action dated Aug. 6, 2013 in Japanese Application No. 2012-188314, filed Aug. 29, 2012.
Office Action dated Mar. 27, 2015 in Taiwanese Application No. 101131187.

* cited by examiner

*Primary Examiner* — Thomas K Pham
*Assistant Examiner* — Marin Pichler
(74) *Attorney, Agent, or Firm* — Saliwanchik, Lloyd & Eisenschenk

(57) ABSTRACT

Disclosed is an optical system. The optical system includes first to fifth lenses sequentially arranged from an object side to an image side. The optical system satisfies 1.5<n2<1.55, 50<v2<70, and 20<v3<30 in which n2 represents a refractive index of the second lens, v2 represents an abbe number of the second lens, and v3 represents an abbe number of the third lens.

6 Claims, 1 Drawing Sheet

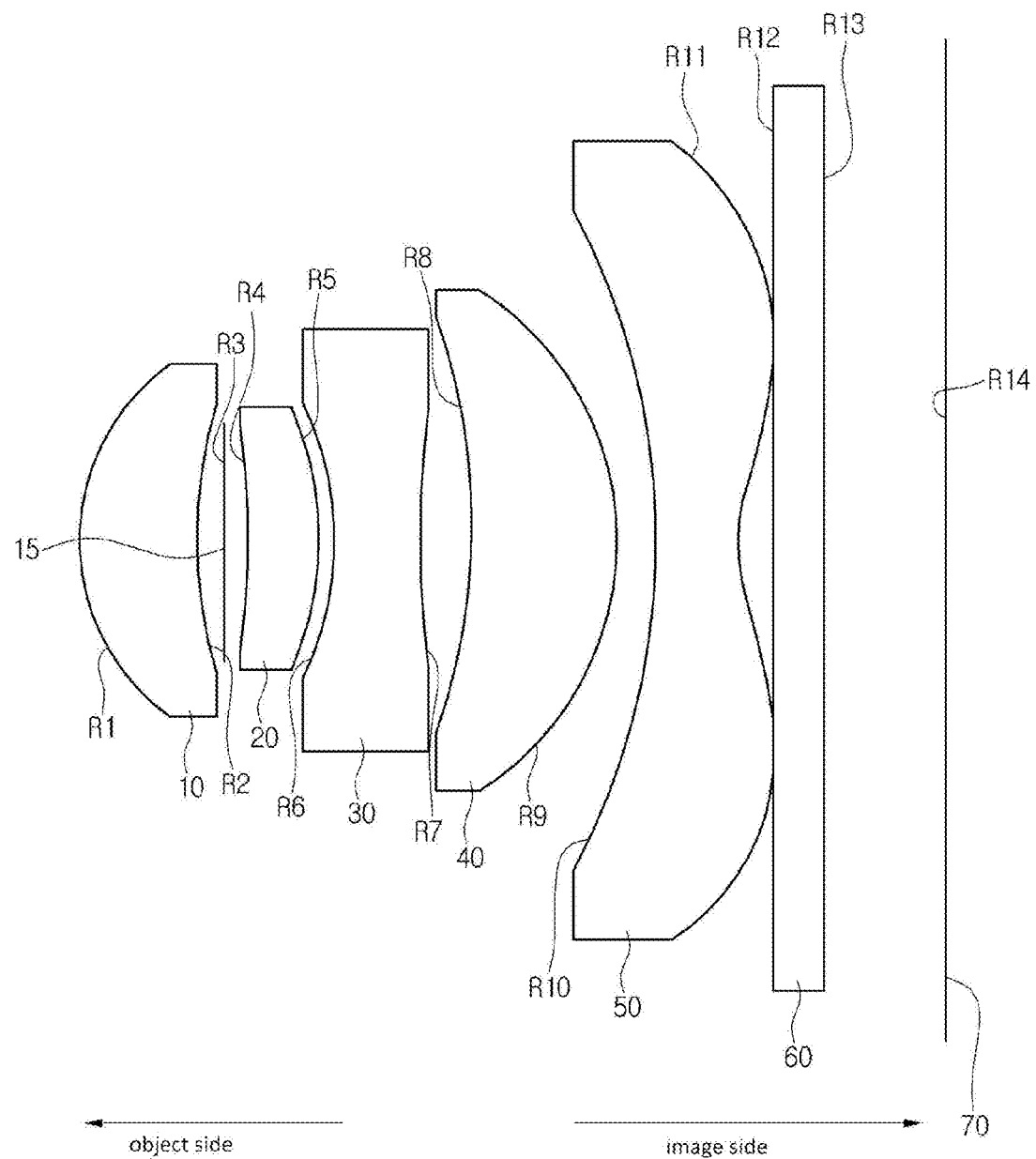

OPTICAL SYSTEM

CROSS-REFERENCE TO RELATED APPLICATION

This application claims the benefit under 35 U.S.C. §119 of Korean Patent Application No. 10-2011-0088194, filed Aug. 31, 2011, which is hereby incorporated by reference in its entirety.

TECHNICAL FIELD

The embodiment relates to an optical system.

BACKGROUND ART

Recently, a portable phone or a mobile communication terminal is equipped with a compact digital camera or a digital video camera employing a solid state image sensor, such as a CCD (charge coupled device) or a CMOS (complementary metal oxide semiconductor) image sensor. Such an image sensor has become scaled-down, so that an optical system used for the image sensor is needed to have a small size and high performance.

In addition, an optical system according to the related art includes first to fourth lenses, a filter, and a light receiving device. In this case, the first to fourth lenses are sequentially arranged upward from an object side. In addition, the first and third lenses may have positive refractive power, and the second and fourth lenses may have negative refractive power. In addition, the second lens may be designed so that the refractive power of the second lens is greater than that of other lenses.

The first lens may have a surface convex toward the object side, and the second lens may have a surface concave toward an image side. The filter may include an infrared filter, and the light receiving device may include a CCD image sensor or a CMOS image sensor.

The above small optical system is disclosed in Korean Patent Application No. 10-2007-0041825.

Technical Problem

The embodiment provides an optical system representing improved performance and a small size.

Technical Solution

According to the embodiment, there is provided an optical system including first to fifth lenses sequentially arranged from an object side to an image side, wherein the optical system satisfies following Equation 1, $$1.5 < n2 < 1.55$$

$$50 < v2 < 70$$

$$20 < v3 < 30 \quad \text{Equation 1}$$

in which n2 represents a refractive index of the second lens, v2 represents an abbe number of the second lens, and v3 represents an abbe number of the third lens.

According to the embodiment, the optical system satisfies following Equation 3, $$0.8 < f1/F < 1.2 \quad \text{Equation 3}$$

in which f1 represents an effective focal distance of the first lens.

According to the embodiment, the optical system satisfies following Equation 4, $$\phi 4 > \phi 1 > \phi 2 \quad \text{Equation 4}$$

in which $\phi 1$, $\phi 2$, and $\phi 4$ represent refractive power of the first lens, refractive power of the second lens, and refractive power of the fourth lens, respectively.

According to the embodiment, the optical system may further include an aperture interposed between the first and second lenses.

According to the embodiment, the first, second, and fourth lenses may have positive refractive power, and the third and fifth lenses may have negative refractive power.

According to the embodiment, sides of the first to fifth lenses facing the object side and sides of the first to fifth lenses facing the image side may be aspheric surfaces.

Advantageous Effects

As described above, when the optical system of the embodiment is designed as described above, the optical system can satisfy following Equation 2.

$$1 < tt1/F < 1.3 \quad \text{Equation 2}$$

In Equation 2, tt1 represents a distance from the surface facing the object of the first lens 10 to the surface facing the image of the fifth lens on the optical axis of the lens system and F represents the whole effective focus length. As described above, the distance from the surface of the first lens facing the object of the first lens to the surface of the fifth lens facing the image of the fifth lens may represent a very small value.

Accordingly, the optical system according to the embodiment can represent improved performance and a small size.

DESCRIPTION OF DRAWINGS

FIG. 1 is a side sectional view schematically showing the internal structure of a small optical system according to the embodiment.

BEST MODE FOR INVENTION

Hereinafter, an image sensor according to the embodiment will be described in detail with reference to accompanying drawings.

FIG. 1 is a side sectional view schematically showing the internal structure of a small optical system according to the embodiment.

Referring to FIG. 1, the small optical system according to the embodiment includes a first lens 10, an aperture 15, a second lens 20, a third lens 30, a fourth lens 40, a fifth lens 50, a filter 60, and a light receiving device 70 which are sequentially arranged from an object side to an image side.

In order to obtain the image of an object, light corresponding to image information is incident onto the light receiving device 70 after passing through the first lens 10, the aperture 15, the second lens 20, the third lens 30, the fourth lens 40, the fifth lens 50, and the filter 60.

The first and send lenses 10 and 20 may have a positive refractive power. The third lens 30 may have a negative refractive power, and the fourth lens 40 may have a positive refractive power. The fifth lens 50 may have a negative refractive power.

In this case, the first lens 10, the second lens 20, and the fourth lens 40 may satisfy following Equation 4.

$$\phi 4 > 100\ 1 > \phi 2 \quad \text{Equation 4}$$

In Equation 4, φ1, φ2, and φ4 represent refractive power of the first lens 10, the refractive power of the second lens 20, and the refractive power of the fourth lens 40, respectively.

In addition, the first to fifth lenses 10 to 50 may include glass or plastic.

A side R1 of the first lens 10 facing an object side may have a convex shape, and a side R2 of the first lens 10 facing an image side may have a concave shape. The side R1 of the first lens 10 facing the object side and the side R2 of the first lens 10 facing the image side may have an aspheric surface. In addition, the first lens 10 may have the shape of a meniscus.

The focus length of the first lens 10 may satisfy following Equation 3.

$$0.8 < f1/F < 1.2 \qquad \text{Equation 3}$$

In Equation 3, f1 represents an effective focal distance of the first lens 10, and F represents a whole focal distance of a small optical system according to the embodiment.

In more detail, the focal distance of the first lens 10 may satisfy following Equation 5.

$$0.9 < f1/F < 1.1 \qquad \text{Equation 5}$$

The second lens 20 may have the shape of a meniscus. A side R4 of the second lens 20 facing the object side may have a concave shape, and the side R5 of the second lens 20 facing the image side may have a convex shape. In addition, the side R4 of the second lens 20 facing the object side and the side R5 of the second lens 20 facing the image side may have an aspheric surface.

The refractive index n2 of the second lens 20 may be in the range of about 1.5 to about 1.55. In detail, based on a line d, the refractive index n2 of the second lens 20 may be in the range of about 1.5 to about 1.55. In more detail the refractive index n2 of the second lens 20 may be in the range of about 1.54 to about 1.55.

In addition, an abbe number v2 of the second lens 20 may be greater than about 50. In detail, the abbe number v2 of the second lens 20 may be in the range of about 50 to about 70. In more detail, the abbe number v2 of the second lens 20 may be in the range of about 55 to about 65.

Both sides of the third lens 30 may have a concave shape. A side R6 of the third lens 30 facing the object side may have a concave shape, and a side R7 of the third lens 30 facing the image side may have a concave shape. In addition, the side R6 of the third lens 30 facing the object side and the side R7 of the third lens 30 facing the image side may have an aspheric surface.

An abbe number v3 of the third lens 20 may be in the range of about 20 to about 30. In more detail, the abbe number v3 of the third lens 30 may be in the range of about 23 to about 27.

The fourth lens 40 may have the shape of a meniscus. A side R8 of the fourth lens 40 facing an object side may have a concave shape, and a side R9 of the fourth lens 40 facing an image side may have a convex shape. The side R8 of the fourth lens 40 facing the object side and the side R9 of the fourth lens 40 facing the image side may have an aspheric surface.

The fifth lens 50 has at least one aspheric inflection point.

In this case, at least one aspheric inflection point may be formed at a side R10 of the fifth lens 50 facing the objection side. In addition, at least one aspheric inflection point may be formed at a side R11 of the fifth lens 50 facing the image side. The aspheric inflection point formed in the fifth lens 50 can adjust the maximum of an incident angle of main ray incident to the light receiving device 70.

If the light receiving device 70 serving as an imaging surface R14 is a charge coupled device (CCD) or a complementary metal oxide semiconductor (CMOS), an angle to ensure the quantity of light exists with respect to each pixel. If a different angle is used in the pixel, the quantity of light is not ensured, a shading phenomenon in which an outer portion of the image is darkened.

Therefore, according to the present embodiment, the maximum of incident angle of the main ray is adjusted by forming the aspheric inflection point at a side R11 of the fifth lens 50 facing the image side, thereby preventing the outer portion of the image screen from being darkened.

The aperture 15 is interposed between the first lens 10 and the second lens 20 to converge selectively incident light so that a focus length can be adjusted.

The filter 60 may include an infrared cut filter (IR cut filter) 60. The IR cut filter 60 prevents radiant heat, which is emitted from external light, from being transferred to the light receiving device 400. In other words, the infrared cut filter 60 transmits visible light, and reflects infrared light so that the infrared light is discharged.

In addition, the light receiving device 70, on which an image is formed, may include an image sensor to convert an optical signal, which corresponds to the image of an object, into an electrical signal, and the image sensor may include a CCD sensor or a CMOS sensor.

The small optical system according to the embodiment satisfies the following Equation 1.

$$1.5 < n2 < 1.55$$

$$50 < v2 < 70$$

$$20 < v3 < 30 \qquad \text{Equation 1}$$

In Equation 1, n2 represents a refractive index of the second lens 20, v2 represents an abbe number of the second lens 20, and v3 represents an abbe number of the third lens 30.

In addition to Equation 1, the small optical system according to the embodiment may satisfy following equation 3.

$$0.8 < f1/F < 1.2 \qquad \text{Equation 3}$$

In Equation 3, f1 represents an effective focus length of the first lens 10, and F represents the whole effective focus length of the small optical system according to the embodiment.

In addition to Equations 1 and 3, the small optical system according to the embodiment may satisfy following Equation 4.

$$\phi 4 > \phi 1 > \phi 2 \qquad \text{Equation 4}$$

In Equation 4, φ1 represents refractive power of the first lens 10, φ2 represents refractive power of the second lens 20, and φ4 represents refractive power of the fourth lens 40.

Therefore, the small optical system according to the embodiment may satisfy following Equation 2.

$$1 < tt1/F < 1.3 \qquad \text{Equation 2}$$

In Equation 2, tt1 represents a distance from the surface facing the object of the first lens 10 to the surface facing the image of the fifth lens on the optical axis of the lens system.

The optical system according to the embodiment represents lower tt1 based on the whole effective focus length. In other words, the distance from the side R1 of the first lens 10 facing the object side to a side R11 of the fifth lens 50 facing the image side may represent a very small value.

Experimental Example

The small optical system according to the experimental example represents an optical characteristic shown in table 1.

TABLE 1

| Lens surface | Radius of curvature (mm) | Thickness (mm) | Refractive index | Abbe number | Note |
|---|---|---|---|---|---|
| R1* | 1.324 | 0.673 | 1.53 | 56.3 | 1st lens |
| R2* | 3.285 | 0.164 | | 61.243 | |
| R3 | ∞ | 0.143 | | | aperture |
| R4* | −5.499 | 0.398 | 1.54 | 56.1 | 2nd lens |
| R5* | −2.708 | 0.100 | | | |
| R6* | −12.545 | 0.481 | 1.63 | 23.4 | 3rd lens |
| R7* | 4.224 | 0.304 | | | |
| R8* | −2.039 | 0.839 | 1.6 | 27 | 4th lens |
| R9* | −1.038 | 0.229 | | | |
| R10* | 3.758 | 0.472 | 1.61 | 25.6 | 5th lens |
| R11* | 1.072 | 0.196 | | | |
| R12 | ∞ | 0.3 | | | filter |
| R13 | ∞ | 0.687 | | | filter |
| R14 | ∞ | 0 | | | sensor |

(mark * represents aspheric surface)

The thickness marked in Table 1 represents a distance from each lens surface to a next lens surface.

Following table 2 shows aspheric surface coefficient of an aspheric lens according to the embodiment.

TABLE 2

| Lens surface | K | $A_1$ | $A_2$ | $A_3$ | $A_4$ |
|---|---|---|---|---|---|
| R1 | 0.004796 | 0.008758 | 0.019205 | −0.00038 | −0.01079 |
| R2 | 0.498626 | 0.028653 | 0.000117 | 0.026017 | −0.04718 |
| R4 | 11.3475 | −0.00663 | −0.05236 | 0.059919 | −0.2176 |
| R5 | 1.16745 | −0.14522 | 0.055656 | −0.00042 | −0.29619 |
| R6 | 222.36 | −0.33446 | 0.0955 | −0.39523 | 0.390843 |
| R7 | −44.0831 | −0.03068 | −0.02955 | 0.050967 | −0.01891 |
| R8 | −2.43553 | 0.040339 | −0.03418 | 0.082181 | −0.02638 |
| R9 | −0.88112 | 0.093358 | −0.06751 | 0.035123 | −0.00412 |
| R10 | −176.444 | −0.14135 | 0.054474 | −0.00823 | −0.00036 |
| R11 | −8.61241 | −0.08503 | 0.023752 | −0.00463 | 0.000543 |

An aspheric surface coefficient of Table 2 for the aspheric lens according to the experimental example can be obtained from Equation 6.

$$z = \frac{CY^2}{1+\{1-(1+K)(C^2Y^2)\}^{1/2}} + (A_1)Y^4 + (A_2)Y^6 + (A_3)Y^8 + (A_4)Y^{10} + (A_5)Y^{12}$$ Equation 6

Z: a distance from a vertex of a lens in an optical axis direction
C: a basic curvature of a lens
Y: a distance in a direction perpendicular to an optical axis
K: a conic constant
$A_1, A_2, A_3, A_4, A_5$: an aspheric constant The aspheric shape for each lens according to the experimental example is determined as described above.

In addition, according to the experimental example, each lens is designed as shown in table 3.

TABLE 3

| | Effective focal length (mm) | Refractive index | Abbe number | Refractive power (1/mm) |
|---|---|---|---|---|
| 1st lens | 3.705080 | 1.53 | 56.3 | 0.27 |
| 2nd lens | 9.33370 | 1.54 | 56.1 | 0.10 |
| 3rd lens | −4.9383 | 1.63 | 23.4 | −0.20 |

TABLE 3-continued

| | Effective focal length (mm) | Refractive index | Abbe number | Refractive power (1/mm) |
|---|---|---|---|---|
| 4th lens | 2.6460 | 1.60 | 27.0 | 0.37 |
| 5th lens | −2.6156 | 1.61 | 26.4 | −0.38 |

When the small optical system according to the experimental example is designed as described above, the small optical system can represent performance shown in following table 4.

TABLE 4

| F | 2.4 mm |
|---|---|
| ttl | 3.803 mm |
| f1/F | 1.54 |
| ttl/F | 1.58 |

As described above, if the small optical system according to the experimental example satisfies Equation 1 and Equations 3 to 5, the values of tt1 and F can be obtained in such a manner that the small optical system satisfies Equation 2.

Accordingly, the small optical system according to the embodiment is designed as shown in Equation 1 and Equations 3 to 5, so that the small optical system can represent improved performance and a small size.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical system comprising, in order from an object side to an image side:
    a first lens in a meniscus shape having a convex surface on an object side of an optical axis of the first lens;
    a second lens in a meniscus shape having a concave surface on an object side of an optical axis of the second lens;
    a third lens having a biconcave shape at an optical axis of the third lens;
    a fourth lens in a meniscus shape having a concave surface on an object side of an optical axis of the fourth lens;
    a fifth lens having at least one aspheric inflection point; and
    an aperture interposed between an image side of the first lens and the object side of the second lens;
    wherein the first lens and the fourth lens each has positive (+) refractive power, and the third lens has negative (−) refractive power; and
    wherein the optical system satisfies following Equation 1, $1.5 < n2 < 1.55$ $50 < v2 < 70$ $20 < v3 < 30$ $20 < v4 < 30$ Equation 1 in which n2 represents a refractive index of the second lens; and v2, v3, and v4 each represents an Abbe number of the second lens, the third lens, and the fourth lens, respectively;

wherein the optical system satisfies following Equation 2, $$t2 < t5 < t3 < t1 < t4 \qquad \text{Equation 2:}$$

in which t1, t2, t3, t4, and t5 represent thicknesses of the first lens, the second lens, the third lens, the fourth lens, and the fifth lens at the optical axes of the first to fifth lenses, respectively.

2. The optical system of claim 1, wherein the optical system satisfies following Equation 4, $$\phi 4 > \phi 1 > \phi 2 \qquad \text{Equation 4}$$

in which $\phi 1$, $\phi 2$, and $\phi 4$ represent refractive power of the first lens, refractive power of the second lens, and refractive power of the fourth lens, respectively.

3. The optical system of claim 2, wherein the second lens has positive (+) refractive power, and the fifth lens has negative (−) refractive power.

4. The optical system of claim 3, wherein the first lens, the second lens, the third lens, the fourth lens, and the fifth lens each has aspheric surfaces on both the object side and the image side.

5. The optical system of claim 1, further comprising a filter and a light receiving device which are provided from the object side to the image side and provided next to the fifth lens.

6. The optical system of claim 1, wherein the aperture is disposed closer to the object side of the second lens than to the image side of the first lens at the optical axes of the first and second lenses.

\* \* \* \* \*